(12) United States Patent
Eyring

(10) Patent No.: US 6,509,844 B1
(45) Date of Patent: Jan. 21, 2003

(54) APPARATUS AND METHOD FOR PROVIDING A PORTABLE LANDING ZONE

(76) Inventor: Chris Eyring, 4912 Atwood Blvd., Murray, UT (US) 84107

( * ) Notice: Subject to any disclaimer, the term of this patent is extended or adjusted under 35 U.S.C. 154(b) by 0 days.

(21) Appl. No.: 09/538,683

(22) Filed: Mar. 30, 2000

Related U.S. Application Data

(60) Provisional application No. 60/149,091, filed on Aug. 16, 1999.

(51) Int. Cl.[7] ................................................. B64F 1/20
(52) U.S. Cl. ..................... 340/954; 340/953; 340/955
(58) Field of Search ............................... 340/946, 947, 340/950, 953, 954, 955, 956; 244/114 R

(56) References Cited

U.S. PATENT DOCUMENTS

| | | | | |
|---|---|---|---|---|
| 3,519,984 A | * | 7/1970 | Zychal | 340/953 |
| 3,771,120 A | * | 11/1973 | Bonazoli et al. | 340/953 |
| 3,939,571 A | | 2/1976 | Studdard | |
| 4,532,512 A | * | 7/1985 | Tanner | 340/950 |
| 4,590,471 A | * | 5/1986 | Pieroway et al. | 340/947 |
| 4,827,245 A | * | 5/1989 | Lipman | 340/321 |
| 4,985,813 A | * | 1/1991 | Putman | 340/321 |
| 5,559,510 A | * | 9/1996 | Strong, III et al. | 340/953 |
| 6,174,070 B1 | * | 1/2001 | Takamura et al. | 340/946 |

OTHER PUBLICATIONS

"Flight Site: The Landing Zone/Scene Safety Kit," http://www.priority1lss.com/flightsite.htm (2 pages).
"TurboFlare: The Toughest, Smartest and Smallest Emergency Lighting System Available," http://www.turbo–flare.com (6 pages).
Air Med, "LZ Safety and Procedures," http://www.med.utah.edu/airmed/lzsafety.html (5 pages).
Palmetto Health Alliance "CareForce," http://www.rmh.edu/tour/landingprep.asp (3 pages).
UCSF Stanford Health Care,"Stanford Life Flight," http://www–med.stanford.edu/shs/lifeflight/lflanding.html (2 pages).
University of Massachusetts, "UMass Memorial Life Flight," http://www.ummed.edu/dept/EMED/landing zone-.htm (3 pages).
Whelen Engineering Company, Inc., "Remote Strobe Power Supplies 1997 Model Selection Guide," (1997 U.S.A.).
Whelen Engineering Company, Inc., "Automotive Products," (1998 U.S.A.).
Whelen Engineering Company, Inc., "Aviation Lighting," (1996 U.S.A.).
Videotape of Invention Demonstration, Jul. 1, 1999.

* cited by examiner

Primary Examiner—Brent A. Swarthout
(74) Attorney, Agent, or Firm—Berne S. Broadbent

(57) ABSTRACT

A portable landing aid apparatus is disclosed along with a method for operation in aiding a pilot of a helicopter to land the helicopter in adverse conditions, such as at night or in inclement weather, at a non-traditional landing site. The landing aid apparatus comprises a plurality of light units that are powered by a portable power supply, such as a battery or an emergency vehicle at the site. Each light unit further includes a white strobe light, a steady burn amber lamp, and a green strobe light. The white strobe light is utilized as a day locator, while the green strobe light is utilized as a night locator. The steady burn amber light is used as a landing locator. The white strobe light is utilized during the day as it is highly visible from long distances and does not interfere with the pilot's vision. The green strobe light is used at night as it is highly visible at night and does not interfere with the pilot's night vision. The amber steady burn locator outlines the landing zone to be utilized by the pilot in landing the helicopter. Each of the plurality of light units is placed within a heavily-weighted base that is made of a material that remains prone on the ground without being blown away by the down wash from the helicopter rotors. A portable visual aid slope indicator (VASI) clearance light system is also disclosed.

17 Claims, 4 Drawing Sheets

APPARATUS AND METHOD FOR PROVIDING A PORTABLE LANDING ZONE

The present patent application claims priority upon U.S. Provisional Application No. 60/149,091, filed Aug. 16, 1999, which is incorporated by reference for all purposes.

BACKGROUND OF THE INVENTION

The present invention relates generally to landing systems used by aircraft and, more particularly, to landing systems used to establish a temporary landing zone for an aircraft, such as helicopter, needing to land in a non-traditional landing spot or under adverse conditions. Further still, the present invention relates to a portable VASI system for use as a temporary or adjustable VASI device.

Aircraft, such as fixed wing airplanes and rotary wing craft such as helicopters, enjoy an important role in both law enforcement and medical assistance. For example, both fixed wing and rotary wing aircraft are utilized to locate criminal suspects during a chase. In a chase setting, a helicopter is typically used to track a crime suspect until law enforcement officers on the ground can locate and apprehend the suspect. During the day, the sight of the helicopter hovering in a given area along with communication between a spotter in the helicopter and the law enforcement officers on the ground aid the officers on the ground in tracking, locating and apprehending the suspect. Likewise, at night, the helicopter will use a spot light to locate a suspect for apprehension.

Aircraft also serve an important function in aiding medical emergencies. Aircraft are used to transport supplies and medical personnel to an accident site and to transport accident victims that are severely injured to medical centers for emergency treatment. Helicopters are often used for medical evacuation of injured persons from an accident scene to a medical center where time is of the essence. These situations typically are when the injured person is suffering a life threatening injury or is in such a remote area that the long trip in a vehicle would either aggravate the injury or prevent other treatment from occurring in a prompt manner.

Unfortunately, helicopters are limited in their operation due to the flight conditions at the time. Specifically, night flights and flying in inclement weather can be dangerous to not only the pilot, but the crew on the helicopter or on the ground at the accident site. This is so because a helicopter needs to land proximate the accident site in order to pick up the injured persons for transport. For a helicopter to land either at night or in inclement weather, a safe landing zone must be identified and marked out in such a way as to allow the pilot to land. Currently, such safe landing zones are difficult to outline and they require at least six skilled landing members to secure a useful landing site. If the weather is extremely violent, landings can be so impractical in view of the current state of the art that the helicopter is useless in transporting the injured persons to the medical center.

Not only are helicopters prone to accidents at unconventional landing sites, but pilots that land aircraft utilizing a visual aid slope indicator (VASI) system have trouble where the VASI is fixed and a portion of the airstrip is under repair or blocked off temporarily. Further still, the pilot may need to land the aircraft in an unfamiliar landing zone and a VASI device would be useful in signaling to the pilot that the strip is clear for landing and that no obstacles are in place or are identified and placed beyond interference with the intended landing location for the aircraft. No such VASI system currently is known that can be moved and set up temporarily to aid a pilot in landing an aircraft where visual indication of known hazards is accounted.

Accordingly, there is a need for a new method or system of signaling a safe landing zone to a helicopter pilot during an emergency landing procedure at an emergency site, such as one involving picking up an injured person for transport to the appropriate medical center. Furthermore, what is needed is a landing aid that can be operated by a minimum number of personnel and is portable to any remote location at which the landing of a helicopter is anticipated. Furthermore, what is needed is a landing aid device that is consistent with standards for helicopter landings, can be set up quickly, and be operated in a manner useful to the pilot to aid the pilot to land. Additionally, what is needed is a VASI system that warns a pilot of known obstacles in the landing path to make landings safer where the site is either temporary or has been blocked at the time access is needed.

SUMMARY OF THE INVENTION

According to the present invention, a portable landing aid apparatus is disclosed along with a method for operation in aiding a pilot of a helicopter to land the helicopter in adverse conditions, such as at night or in inclement weather, at a non-traditional landing site. The landing aid apparatus comprises a plurality of light units that are powered by a portable power supply, such as a battery or an emergency vehicle at the site. Each light unit further includes a white strobe light, a steady burn amber lamp, and a green strobe light. The white strobe light is utilized as a day locator, while the green strobe light is utilized as a night locator. The steady burn amber light is used as a landing locator. The white strobe light is utilized during the day as it is highly visible from long distances and does not interfere with the pilot's vision. The green strobe light is used at night as it is highly visible at night and does not interfere with the pilot's night vision. The amber steady burn locator outlines the landing zone to be utilized by the pilot in landing the helicopter. Each of the plurality of light units is placed within a heavily-weighted base that is made of a material that remains prone on the ground without being blown away by the down wash from the helicopter rotors.

The light elements within the light unit are placed in a raised position so they provide a 360 degree field of view around the light unit, thereby serving as a beacon to all points approaching the landing location. The raised light elements allow the lights to be viewed from any direction approaching the landing zone. A clear dome cover is placed over the lighting elements to protect them from breaking. Each lighting unit is electrically connected to the power supply via a flexible power cable.

A minimum of two light units can serve as landing lights to aid the helicopter pilot to locate the landing site and land the helicopter in the target landing zone. Additional lighting units are desirable to improve the actual target landing zone. In one embodiment, six light units are arranged in an arrow-like configuration. Two light units are spaced far enough apart from one another so the helicopter can land between them. These two light units form the base points of the arrow. Two additional light units are spaced apart from each other a shorter distance than the first two light units, but far enough that the helicopter can land between them. The last two light units are placed at the point of the arrow in a line substantially perpendicular to a line drawn between the first two light units or even the second two light units. These last two units serve to align the helicopter during landing.

An operator operates a control box that is used to turn off or on the light elements within each of the light units. The control box can have a separate on/off switch for either the white strobe light, the green strobe light, or the amber steady burn lights. This is useful in that the strobe lights typically are turned off after the pilot has located the landing zone thus using only the amber lights to pilot the helicopter to a safe landing.

BRIEF DESCRIPTION OF THE DRAWINGS

The foregoing and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SPECIFIC EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 4, is not intended to limit the scope of the invention, as claimed, but it is merely representative of the presently preferred embodiments of the invention.

The present embodiments of the invention will be best understood by reference to the drawings, wherein like parts are designated by like numerals throughout.

Figure 1:
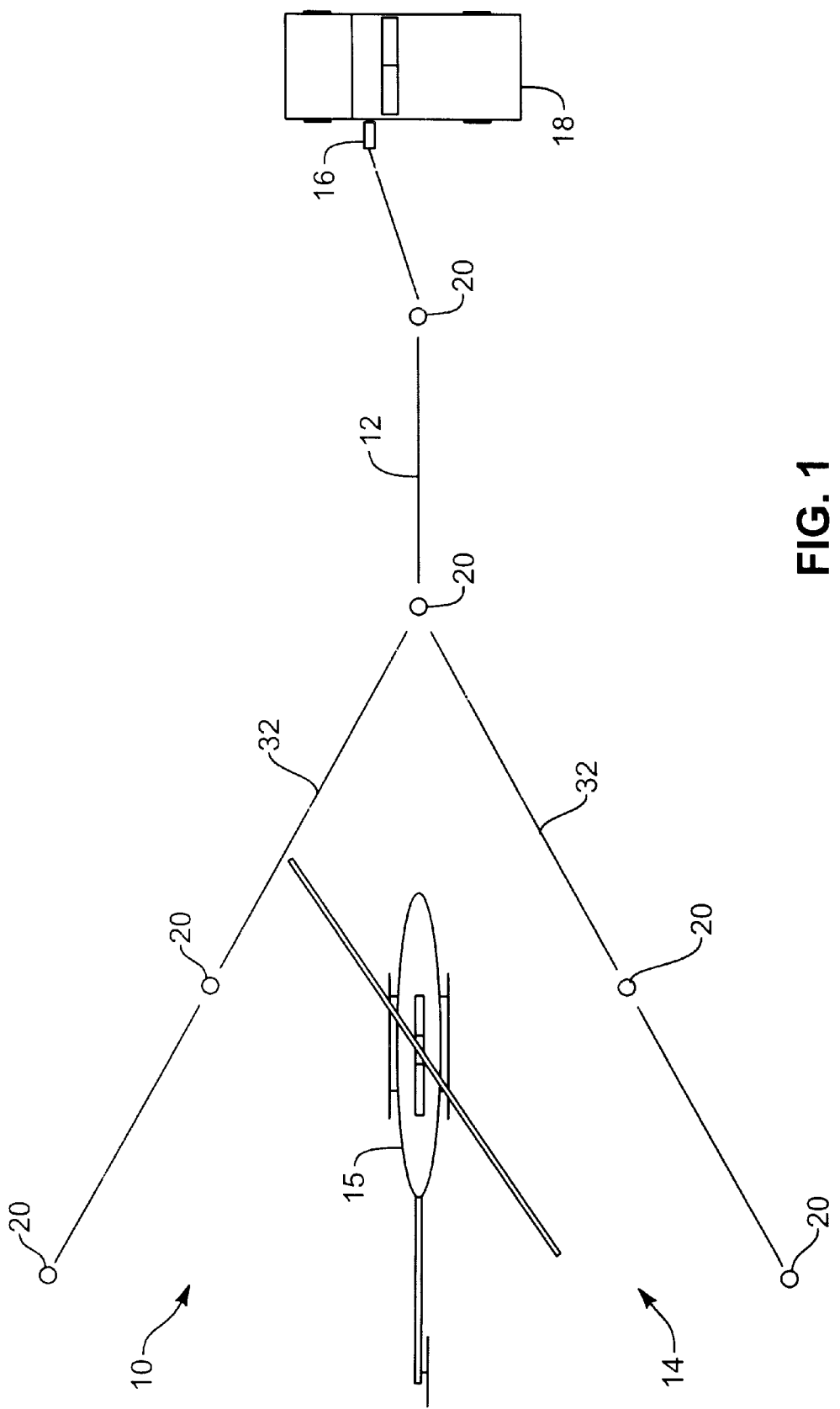
FIG. 1 illustrates in schematic form a landing zone outlined by the landing aid apparatus in accordance with the present invention implemented with a public safety vehicle.

The present invention provides for a portable landing aid apparatus that enables a helicopter pilot to safely locate a landing zone and land a helicopter in emergency or adverse circumstances. These adverse circumstances include unfamiliar terrain where the pilot must rely upon ground personnel to determine a safe landing port for the helicopter, inclement weather such as cloudiness, fog, rain, sleet, snow, hail, and the like; and night time landings at emergency sites. FIG. 1 illustrates a landing zone 10 that utilizes the landing aid apparatus 12 for establishing a target landing zone 14. Portable landing aid apparatus 12 is used with or without a public safety vehicle 18. A ground crew member operates a control box 16 that is used to turn on the light units found within the portable landing aid apparatus 12.

Figure 2:
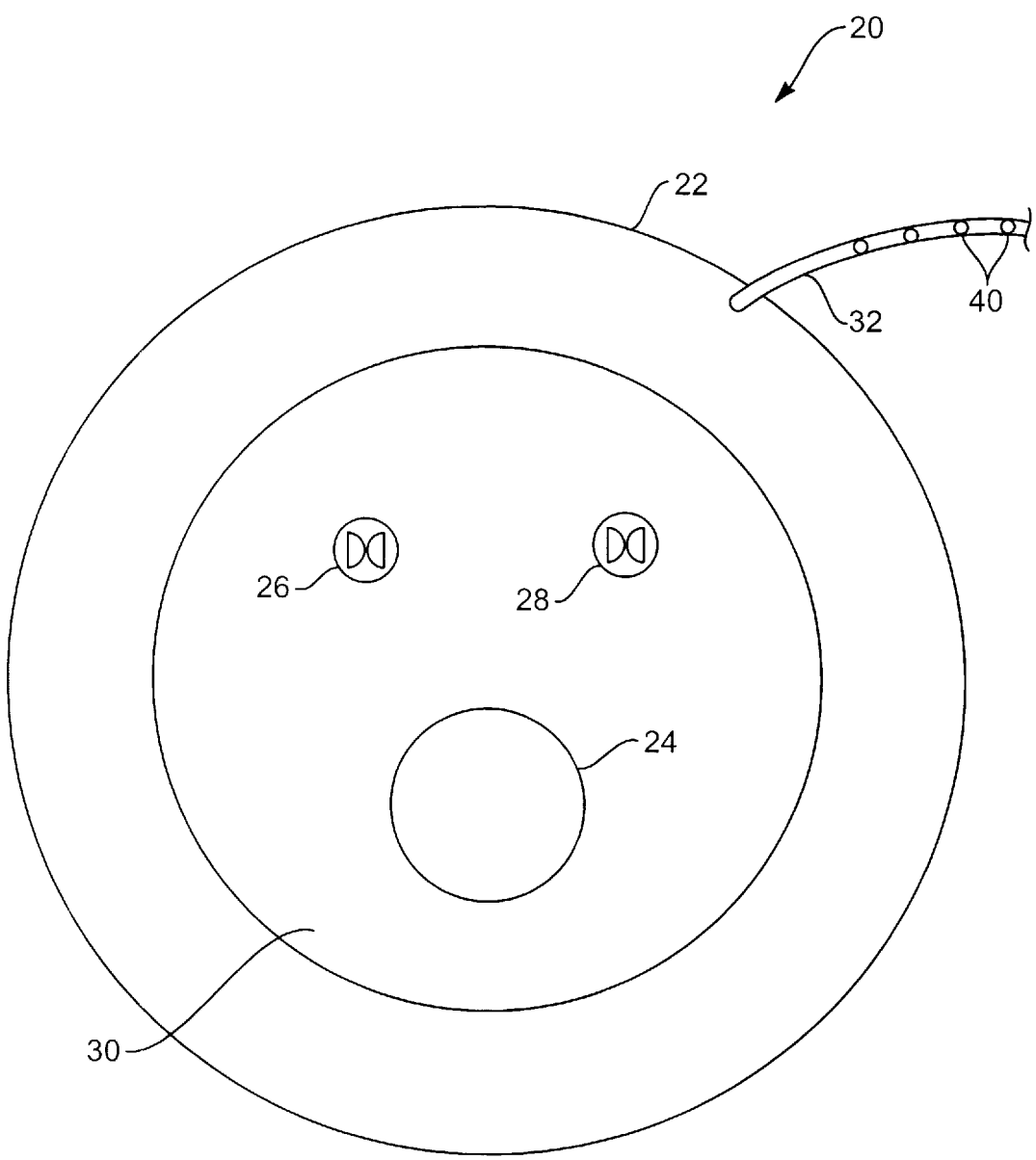
FIG. 2 illustrates a schematic diagram of a portable landing aid light head unit in accordance with the present invention.

Portable landing aid apparatus 12 includes a plurality of light units 20 that are depicted in greater detail in FIG. 2. Landing aid apparatus 12 further includes a control box 16, that provides for a power supply as well as control switches to operate each light unit within the landing aid apparatus. Landing aid apparatus 12 is powered by a portable power supply, such as a heavy duty battery unit or a power supply provided by a public safety vehicle, such as, for example, a police car, fire truck, emergency response vehicle, or any vehicle that has a power outlet typically available in combination with a cigarette lighter. The power supply may be coupled to the vehicle battery through a port mounted in the grill of the vehicle or on the side. A weather proof cap fits over the electrical port to protect against the elements and dirt from corroding the port. Such ports serve as electrical extension outlets to power electrical items in time of need or emergency and are well known to those skilled in the art.

Each of the plurality of lighting units 20 (in this illustration there are six lighting units) are placed in a landing zone configuration to aid the pilot in landing the helicopter 15. The landing zone configuration illustrated in FIG. 1 is that of a triangle with a line extending from one point of the triangle to form an arrow configuration. For example, each light unit 20 may be placed on a street in a configuration familiar to a pilot that aids in the pilot landing the helicopter efficiently and safely. Other configurations are possible and the configuration illustrated in FIG. 1 is not limiting to other types of possible configurations. For example, the plurality of light units 20 may be arranged in a circular configuration, a diamond configuration, a box configuration, a rectangle configuration, or any other useful geometric configuration or cross configuration that enables a pilot to land the helicopter accurately and safely. Although there are six light units shown in this embodiment, a minimum of two light units would be adequate in outlining a proper target landing zone for the helicopter pilot. Other configurations can include three light units or from four to ten light units. Importantly, enough light units are to be used for the emergency circumstances at the time.

Each light unit 20 is illustrated in FIG. 2 and is comprised of an assembly that is not easily tipped or washed away by the rotor wash from the helicopter upon approach and landing in the target landing zone. Additionally, the light unit 20 can be secured to the ground via a spike or other securing device to prevent moving or tipping of the unit. Each light unit 20 includes a heavy, non-skid base 22 in which at least three light units 24, 26, and 28 are provided. Light unit 24 is a steady burn locator light in having the color amber, which is utilized as it does not interfere with a pilot's night vision. Light element 26 is a white strobe that strobes to draw attention to the landing zone from a far off distance when the pilot is trying to sight the landing zone. The white strobe light is utilized for day location as the pilot's vision is not affected by the strong pulses of light during normal daylight. Light element 28 is a green strobe light utilized for night location. The green strobe does not affect the pilot's night vision in a way that the white strobe light would if that were the only strobe light being used. Once the pilot has located the landing site, the pilot communicates to the ground crew member that the landing site has been sighted and that strobe lights are no longer necessary for drawing attention to the site. From this point the strobe lights are deactivated and the pilot uses the amber lights to guide the pilot to the location and perform a safe landing. It is evident to those skilled in the art that these colors are useful in that the FAA has established them as proper colors for actual use in landing helicopters. Other colors that would be beneficial and serve the same purpose as the day strobe, night strobe, and steady burn lights may be freely changed for any desired situation.

The lights can be selected from commercial grade FAA approved lamps typically used in landing systems. Also, the lights can be LED lights that have sufficient brightness for the intended purpose to serve as a landing aid. LED lightshave other advantages in that they have low-power consumption and are long-lived compared to typical incandescent or exotic lights such as halogen or the like.

Figure 3:
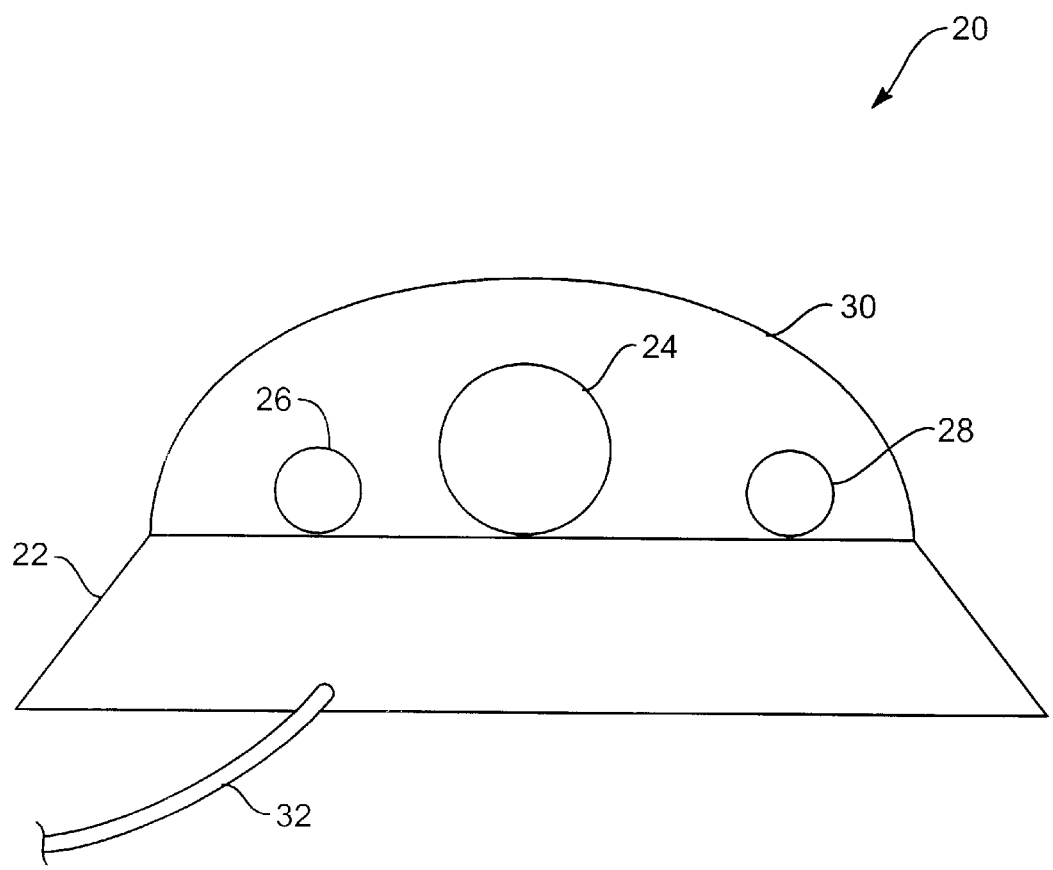
FIG. 3 illustrates a side plan view of the light head unit shown in FIG. 2.

Each light unit 20 further includes a clear spherical dome 30 made of a thick shatterproof material to protect the light elements 24, 26, and 28 within each light unit 20. FIG. 3 illustrates how light elements 24, 26, and 28 are placed above the base of the light unit so as to be visible from any approaching direction. A flexible power cable 32 provides power to each light element from control box 22 and is made of a heavy duty flexible material that allows each light unit to be handled by a single individual allowing the person to quickly place each light unit without having to carry all of the plurality of light units within. the landing aid apparatus 12.

The entire assembly is designed to be compact so that it can fit into a carrier, such as a zipped duffle bag, which can be located within a trunk or storage compartment on the safety vehicle. Also, dome 30 can screw in or out of light unit 20 quickly to allow replacement of one or more light elements 24–28. Further still, dome 30 can incorporate all the light elements 24–28 for easy replacement and upgrade in the field without the need for special tools typically required in removing light elements 24–28 that are separate and secured in the base portion of light unit 20. This also allows for different colored lights to be replaced where each light 24–28 has its own dome 30 and is readily screw-insertable into the base of light unit 20.

Each cable section 32 also can incorporate a length of lights to add further lighting effect of the apparatus 12. For example, a plurality of LED lights 40 can be added to cable 32 to increase landing visibility, as well as provide a safety zone for bystanders, indicating where not to cross. Incandescent lights are possible in this application as well. Wave guides that are flexible can be used as an alternative application. When lights or wave guides are utilized within cable 32, cable 32 can be formed to have a generally flat shape that allows it to stay positioned on the ground without twisting and distorting the effectiveness of the lights or wave guides.

In an alternative embodiment, the lights can be configured to be wireless. Thus, each light unit is individually powered with a portable power source, such as a battery means, and includes a receiver to control the light pattern, whether it be on or off, or flashing. The receiver operates on a frequency of a transmitter controlled by the system operator, who determines which lights are on and changes the light pattern as the helicopter approaches for final landing consistent with the light patterns described above. Further still, each light can have a unique flash pattern, as selected by the operator, so that a desired pattern can be achieved during operation. Transmitters and receivers are well known to those skilled in the art and are left for the designer to select and properly implement.

The portable landing aid apparatus 12 has been tested in actual field operation during night conditions and has found to be very satisfactory in enabling a helicopter pilot to first locate the landing site and second, land the helicopter in the landing zone established by the landing aid apparatus. A video tape taken of an actual test of the landing aid apparatus including the pilot's comments during the test in locating the landing zone and how the steady burn light elements enable the pilot to land the helicopter is also provided in this provisional disclosure application. The video demonstration also highlights that there are technicalities that have to be achieved in order to optimize the landing apparatus. These are achieved in the embodiments shown in FIGS. 2 and 3 for the light unit. Specifically, the light unit needs to be visible from any approach point the helicopter takes in locating the landing zone. The light elements must be elevated in such a way that they can be spotted from a distant horizon without the pilot needing to be positioned directly above the light units. Further, it is clear within the video demonstration that the strobe lights are useful in initially locating the landing zone, but are detrimental in aiding the pilot in actually landing the aircraft in the desired landing zone.

Although the landing aid apparatus has been illustrated to comprise a plurality of light units that are connected together via a power cable, other embodiments are also possible. For example, flexible light wave guides that can be laid out upon a reasonably flat surface, such as the ground, may be substituted for the actual light units. These light wave guides can be anywhere from five feet long to fifty feet long an arranged in the previously described geometric patterns to aid the pilot in landing the aircraft. These wave guide elements can be manufactured within a tarp-like material that can be rolled and folded for easy transport and use. The tarp material can be stored within a protective bag and then removed at the emergency site. The tarp is then rolled out quickly by either one or more personnel, connected to the power supply and then illuminated by light elements that interact with the light wave guide sections to provide a useful landing zone.

A proper landing zone should be a minimum of 60' by 60'. A preferred safety zone is approximately 100'×100'. This provides safe clearance from the helicopter and keeps bystanders away from the tail rotor.

Another aid to landing in unfamiliar territory in accordance with the present invention is a visual aid slope indicator (VASI) clearance light system. VASI lights are used on runways as fixed descent guides that prevent a pilot from coming in too low and clipping a landmark, such as power lines, a hill or buildings, or the like. The VASI also helps a pilot to avoid coming in at too steep an angle during a landing approach.

Typically, VASIs are spaced intermittently along one or both sides of airport runways to aim narrow split beams of light, elongated in the horizontal plane, at approaching aircraft. Further, the upper beam segment is white and the lower segment is red with the transition zone being pink. The farthest light unit of a two unit system, for example, is aligned and positioned so that the bottom of the red or lower segment is parallel to the glide path and forms the upper limit of the ideal glide path. In such a system, the light unit closest to approaching aircraft is aligned and positioned so that the top of the white or upper segment is aimed into the glide path and the bottom of the white segment is approximately parallel to the glide path and forms the lower limit of the ideal glide path. When an aircraft is on the proper glide path, the closest unit will appear white to the pilot and the farthest will appear red. If the approach is too high, both units will be- seen as white and a low approach is indicated by both units appearing red. Alternatively, both colors may blend to form pink to indicate when the approach is too low.

Figure 4:
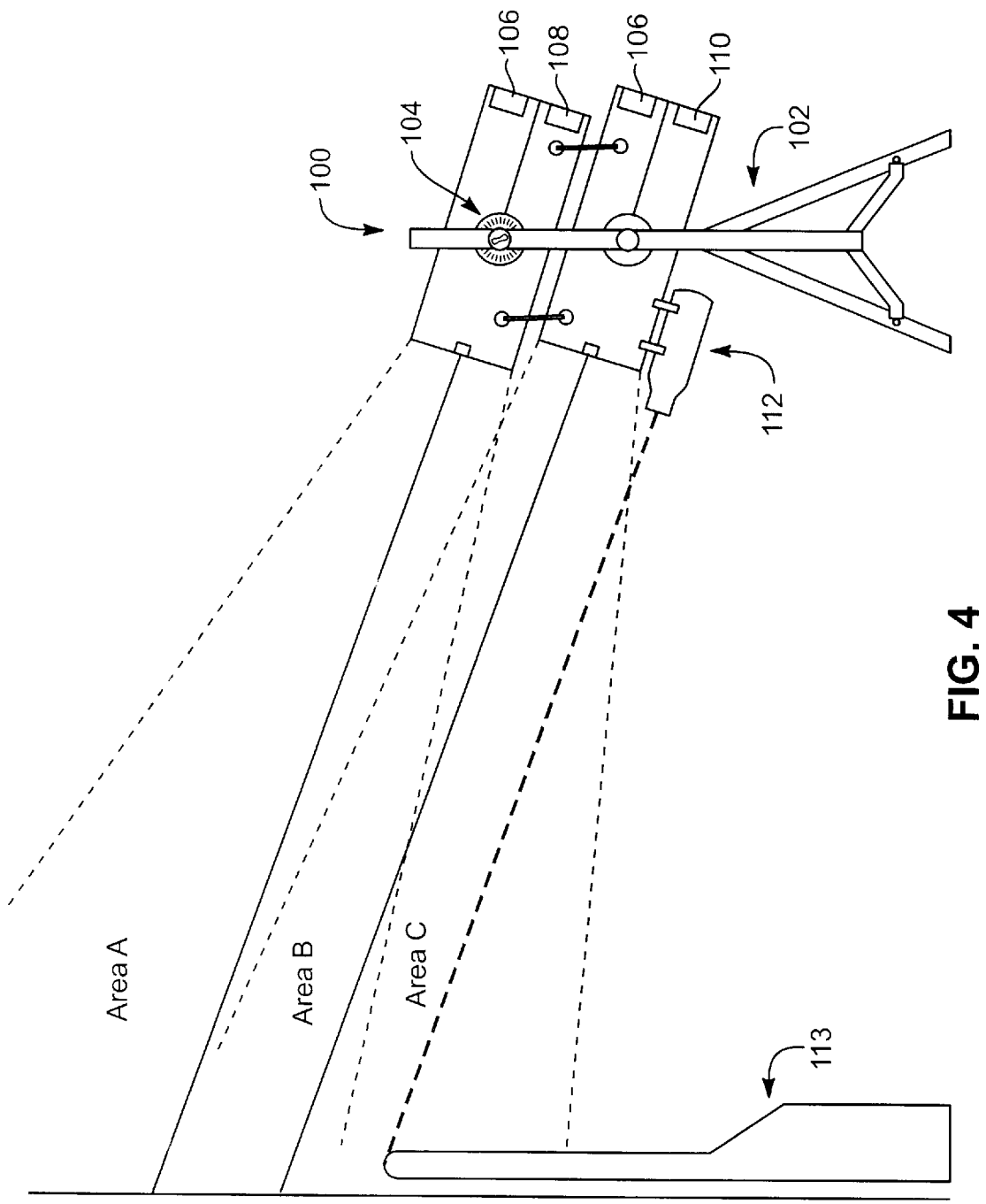
FIG. 4 illustrates a portable VASI device in accordance with the present invention.

A VASI signal incorporates lights that signal when the pilots descent is too low, too high, or just right. A portable VASI signal device 100 is illustrated in FIG. 4. The signal device includes a stand 102, a pitch adjustment means 104, and a plurality of lights 106, 108, 110. Light 106 is a red light that warns a pilot that the aircraft is coming in too low. Light 108 works with light 110, which are both white, to indicate to the pilot that the descent path is correct and thus avoids known landmarks and obstacles that would be in a lower flight descent path. Polarization plates 114 placed adjacent lights 106–110 function to provide different angles of view to the pilot and are well known to those skilled in the art. The VASI can be adjusted to any safe descent path using an alignment tool 112, such as an alignment laser.

The laser is pointed at or above the top most obstacle 113 that needs to be avoided. The device 100 is portable so it can be used in the field as well as at traditional airfields. The VASI device 100 can also be utilized in conjunction with the landing aid 10 of FIG. 1 to provide a more secure and safe landing zone for the pilot. The VASI device is intended to be used with both fixed-wing and non-fixed wing aircraft. The device is also helpful when a portion of a runway is under repair, especially near the fixed VASI warning system already installed at the airfield. The permanent warning system can be disabled and a temporary system set up in a safe location to guide pilots past the construction portion to a safe landing on the runway.

The device 100 warns a pilot of an improper descent by showing at least two red lights to the pilot. A safe descent is signaled by two white lights shown to the pilot. The VASI device 100 follows standard F.A.A. rules for set up and is well within the ordinary skill of an artisan in this field. The lights mount to a portable stand 104, which includes angle adjustment means 104 that are used to select an angle to horizontal ranging from 0 to 90 degrees. The device is portable utilizing many of the same components as that for the landing aid apparatus of FIGS. 1–3. Specifically, power connects and cables are provided so that a portable or transportable power source can be used to power the portable VASI device 100.

The present invention may be embodied in other specific forms without departing from its spirit or essential characteristics. The described embodiments are to be considered in all respects only as illustrative, and not restrictive. For example, the light units can include their own power supply, thereby eliminating the need for the cord. Also, a receiver may be included in each light unit to operate and control the action of the lights therein. Further still, the light units may be mounted in a water-proof and lighter that water base for use in water environments, such as lakes, rivers, oceans, reservoirs, etc. The scope of the invention is, therefore, indicated by the appended claims, rather than by the foregoing description. All changes which come within the meaning and range of equivalency of the claims are to be embraced within their scope.

What is claimed and desired to be secured by united states letters patent is:

1. A portable aircraft landing apparatus configured to aid in the landing of a non-fixed wing air craft, the apparatus comprising:

a power cable having a plurality of lights;

a plurality of light groups, each light group comprising a plurality of lights, and each light group being connected in a spaced apart arrangement to the power cable, wherein the light groups are configured to be arranged in a pattern to define a landing zone for the non-fixed wing aircraft, and wherein the plurality of lights of the power cable are spaced apart from one another to form a light strip along the power cable between each light group;

a power connector, coupled to the power cable and connectable to a power source to power the plurality of lights of the plurality of light groups and the plurality of lights of the power cable; and a control system, coupled to the plurality of light groups and the power cable, to control the operation of each light group.

2. The apparatus as recited in claim 1, wherein each light group comprises at least one of:

(i) a white strobe light;
 (ii) a green light, and
 (iii) an amber light.

3. The apparatus as recited in claim 1, wherein at least one of the plurality of lights of the power cable is an LED light.

4. The apparatus as recited in claim 1, wherein at least one of the plurality of lights of the plurality of light groups is an LED light.

5. The apparatus as recited in claim 1, wherein each light group comprises a base in which the lights are mounted, and wherein the lights are mounted to be above the base and visible in a 360 degree horizontal field.

6. The apparatus as recited in claim 1, wherein each light group includes a transparent dome over the lights.

7. The apparatus as recited in claim 1, wherein a light group is located proximate the power connector.

8. The apparatus as recited in claim 1, wherein the power cable includes a first end, a branch, and two extensions from the branch, each extension having an end, wherein the power cable has a Y-shape and wherein at least one light group is located proximate the branch and another light group located at the end of each extension.

9. The apparatus as recited in claim 8, wherein the total number of the plurality of light groups is six light groups, wherein one light group is connected to each end of the extensions, one light group is connected proximate the branch, one light group is connected approximately between the branch and the first end, and one light group is connected between each extension end and the branch.

10. A method for providing a portable aircraft landing apparatus configured to aid in the landing of a non-fixed wing aircraft at a non-traditional landing site, the method comprising the steps for:

providing a plurality of light groups in a spaced apart arrangement that defines a landing zone for the non-fixed wing aircraft, wherein each light group includes a plurality of lights;

using a power cable having a plurality of lights therein to connect the plurality of light groups;

spacing the plurality of lights of the power cable to form a light strip along the power cable between each light group;

connecting the power cable to a power source to selectively illuminate the one or more lights of the power cable and the plurality of lights of the plurality of light groups using a control system to control the operation of the one or more lights of the power cable and the plurality of lights of the plurality of light groups.

11. The method as recited in claim 10, wherein the step for providing a plurality of light groups in a spaced apart arrangement comprises the step for arranging the plurality of light groups into a Y-shape that defines a landing zone for the non-fixed wing aircraft.

12. The method as recited in claim 10, further comprising the step for selectively providing illumination from each of the plurality of light groups that is visible in a 360 degree horizontal field.

13. The method as recited in claim 12, further comprising the step for illuminating a white strobe light of the plurality of lights as a day locator.

14. The method as recited in claim 12, further comprising the step for illuminating a steady burn amber lamp of the plurality of lights as a landing locator.

15. The method as recited in claim 12, further comprising the step for illuminating a green strobe light of the plurality of lights as a night locator.

16. The method as recited in claim 12, wherein the step for selectively providing illumination from each of the plurality of light groups that is visible in a 360 degree horizontal field further comprises the step for placing each of the plurality of light groups within a weighted base that resists being blown away by down wash from the non-fixed wing aircraft.

17. A portable aircraft landing apparatus configured to aid in the landing of a non-fixed wing air craft, the apparatus comprising:

a power cable;

a plurality of light groups, each light group being connected in a spaced apart arrangement to the power cable, wherein the light groups are configured to be selectively arranged in a pattern to define a landing zone for the non-fixed wing aircraft, each light group comprising a plurality of lights further comprising a first strobe light designed to be powered on during the daytime, a second strobe light designed to be powered on during the nighttime when said first strobe light is powered off, and a steadily burning light wherein said first strobe light, said second strobe light, and said steadily burning light are all spaced apart from each other, with respect to the horizontal plane that is parallel to the ground, so that the light from each of the three said lights is visible in a 360 degree horizontal field;

a power connector, coupled to the power cable and connectable to a power source to power the plurality of lights of the plurality of light groups; and a control system, coupled to the plurality of light groups and the power cable, to control the operation of each light group.

\* \* \* \* \*